United States Patent [19]
Hall et al.

[11] Patent Number: 5,473,301
[45] Date of Patent: Dec. 5, 1995

[54] ENERGY STORAGE INDUCTOR APPARATUS

[75] Inventors: David J. Hall, Pittsburgh; Thomas Kupiszewski, Harrison City; Timothy K. Deis, Pittsburgh; Phillip A. Sanger, Monroeville, all of Pa.

[73] Assignee: Westinghouse Electric Corporation, Pittsburgh, Pa.

[21] Appl. No.: 304,292

[22] Filed: Sep. 12, 1994

[51] Int. Cl.⁶ ........................................ H01F 7/22
[52] U.S. Cl. ..................... 335/216; 335/299; 336/181; 336/228; 336/DIG. 1
[58] Field of Search ....................... 335/216, 299; 174/125.1; 336/DIG. 1, 55, 58, 60, 61, 62, 180, 181, 185, 209, 228, 229; 323/360; 376/133, 142; 505/879, 880

[56] References Cited

U.S. PATENT DOCUMENTS

| | | | |
|---|---|---|---|
| 1,665,947 | 4/1928 | Brennan | 336/228 |
| 4,901,047 | 2/1990 | Wipf | 335/216 |
| 4,994,015 | 2/1991 | Cadwell | 600/13 |

*Primary Examiner*—Leo P. Picard
*Assistant Examiner*—Raymond M. Barrera

[57] ABSTRACT

A superconducting energy storage inductor having two D-shaped coils with their flat sides being adjacent and facing one another. The coils are restrained from moving relative to one another and are immersed in a cryogenic fluid. The coils are connected in series and when provided with current, the resulting magnetic fields of the coils oppose one another.

11 Claims, 7 Drawing Sheets

ENERGY STORAGE INDUCTOR APPARATUS

BACKGROUND OF THE INVENTION

1. Field of the Invention

The invention in general relates to inductors, and more particularly to a superconducting inductor for energy storage.

2. Description of Related Art

An electrical inductor is capable of storing energy in the magnetic field produced by current flowing through the inductor. If the inductor is a superconducting inductor, extremely large amounts of energy can be stored for relatively long periods of time in that once in the superconducting state, resistance of the inductor winding approaches zero ohms enabling the winding to carry large currents with little loss. A cryogenic fluid system keeps the inductor at the temperature required for superconductor operation.

Superconducting magnetic energy storage systems find use in the electrical utility industry and may be used in industrial, transportation and defense applications. A commonly used superconducting inductor takes the form of a cylindrical solenoid which allows more energy to be stored within a given volume. These solenoidal superconducting inductors produce an extremely large external magnetic field that not only may impair other electrical equipment, but poses a health risk to personnel in the vicinity.

Toroidal inductors which produce relatively smaller external magnetic fields have also been constructed. However, for the same amount of energy the toroidal inductors require more turns and larger coils.

The solenoidal superconducting inductors require extensive magnetic shielding such as thick steel plates, to reduce the exclusionary zones for equipment and personnel.

The inductor of the present invention significantly decreases the exclusionary zone volume and without the requirement for extensive magnetic shielding.

SUMMARY OF THE INVENTION

An improved energy storage inductor is provided having first and second D-shaped elongated coils. The flat sides of the D-shaped coils are adjacent and facing one another and the windings of the coils are oriented such that when supplied with electric current, the resulting magnetic fields of the first and second D-shaped coils oppose one another. Containment means is provided to support and restrain movement of the D-shaped coils relative to one another and in a preferred embodiment the coils are superconducting coils emersed in a cryogenic container.

DESCRIPTION OF THE PREFERRED EMBODIMENTS

Figure 1A:
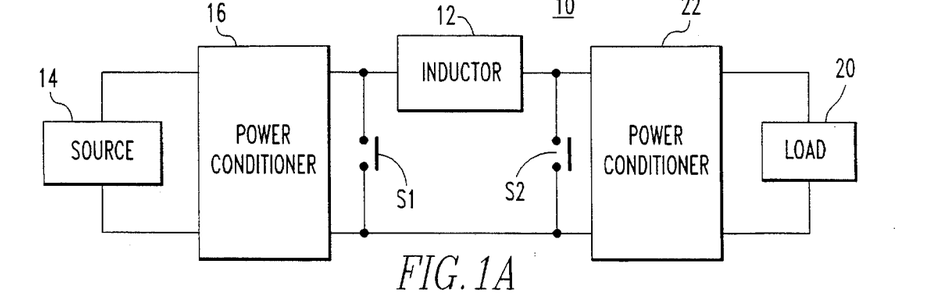
FIGS. 1A through 1D illustrate a magnetic storage energy system in various stages of operation.

FIG. 1A illustrates, in simplified block diagram form, some elements of a magnetic energy storage system 10. The system includes a magnetic energy storage inductor 12 which is supplied with charging current from a source 14. In order to accommodate different sources, and to provide inductor 12 with a DC charging current, the system includes power conditioner circuitry 16 interposed between the source 14 and inductor 12.

Power is delivered to a load 20 at the output end of the system via another power conditioner circuit arrangement 22. Switches S1 and S2 are provided for controlling current flow, as will be described.

Figure 1B:
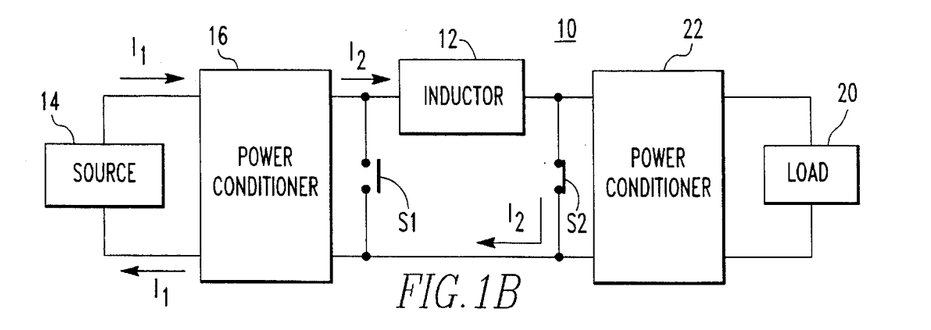

FIG. 1B illustrates the charging mode of operation. With switch S1 open and switch S2 closed, source 14 provides charging current $I_1$. After conditioning in power conditioner circuitry 16, the charging current, designated $I_2$, charges up the inductor 12.

Figure 1C:
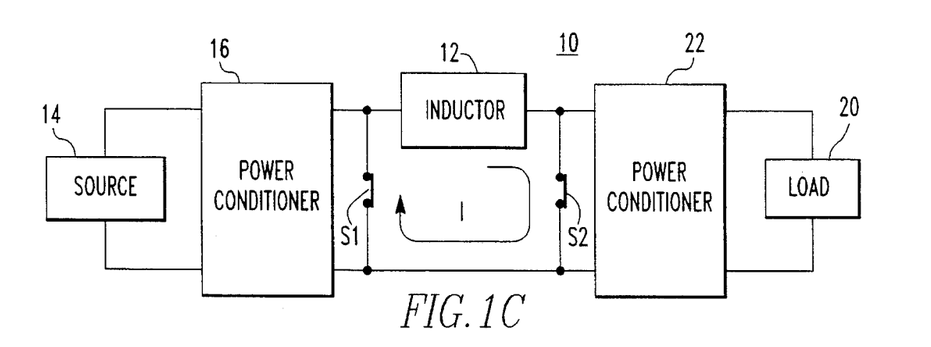

After the charging cycle, and as illustrated in FIG. 1C, switch S1 is closed so that the stored current I traverses the loop which includes inductor 12, switch S2 and switch S1.

Figure 1D:
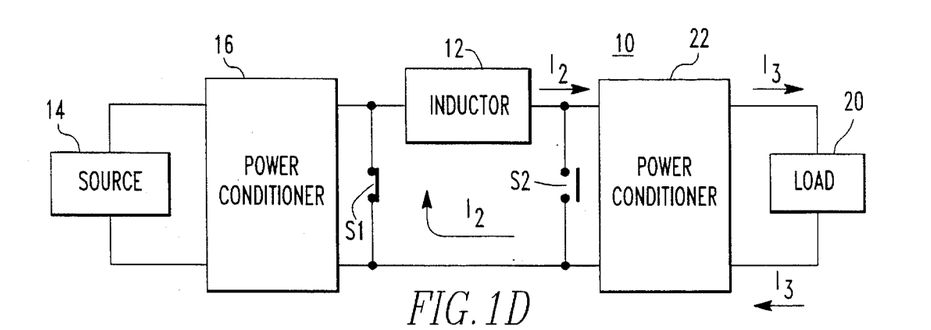

When power is to be delivered to the load, and as illustrated in FIG. 1D, switch S2 is opened and current $I_2$ is conditioned and provided to load 20 as indicated by current $I_3$. If inductor 12 is a cryogenically cooled superconducting inductor, extremely large amounts of energy may be stored for relatively long periods of time until needed.

Figure 2:
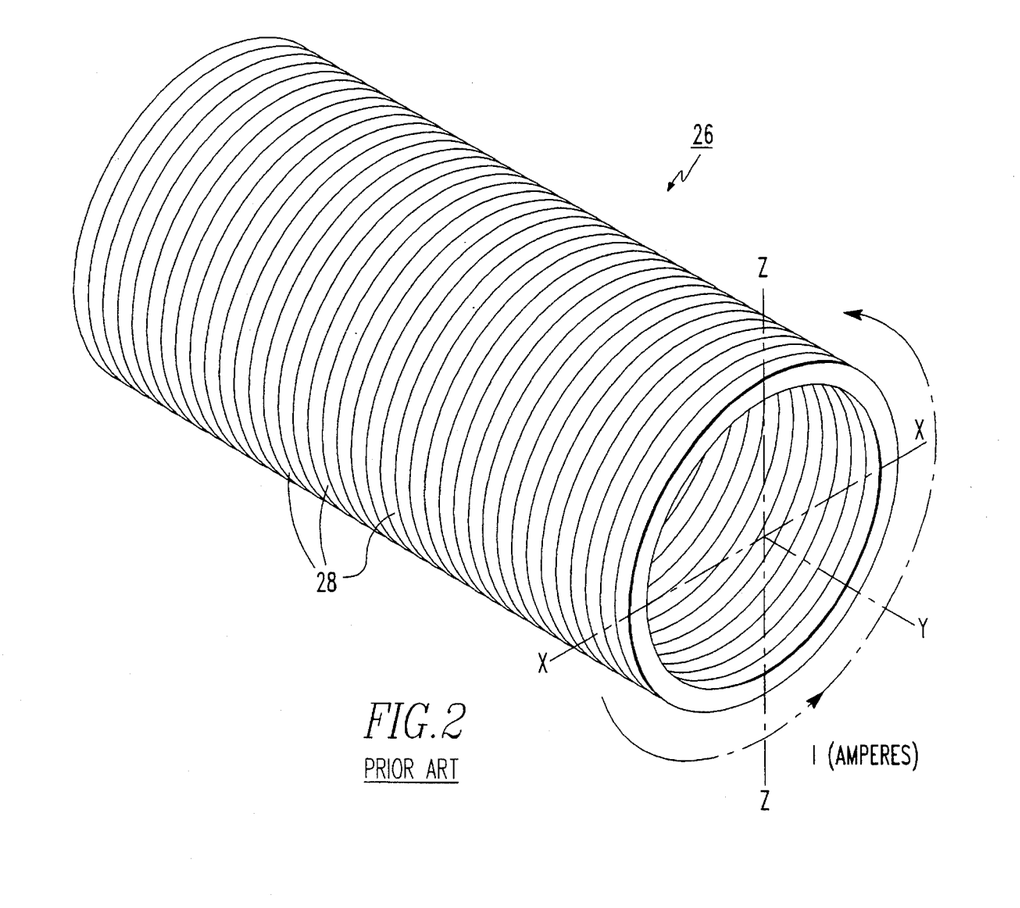
FIG. 2 illustrates a solenoidal inductor coil commonly in use for magnetic energy storage.

FIG. 2 illustrates a typical inductor in the form of a solenoidal coil 26 made up of a plurality of turns 28 of superconducting wire such as niobium-titanium, which, during operation, would be emersed in a cryogenic fluid (not shown).

During operation an external magnetic field is generated which can be injurious to human health and which can interfere with the proper operation of various electronic devices. Let it be assumed for purposes of example, that the solenoid 26 has the following parameters listed in Table 1:

TABLE 1

| | |
|---|---|
| Overall Coil Envelope: | 0.8 m × 0.8 m × 1.6 m |
| Number of Turns: | 2000 |
| Current Density: | 100 A/mm² |
| Peak Current: | 4000 Amperes |
| Peak Internal B Field: | 5.80 Tesla |
| Inductance: | 1.22 Henries |
| Energy Storage: | 9.75 Mega Joules |

Figure 3:
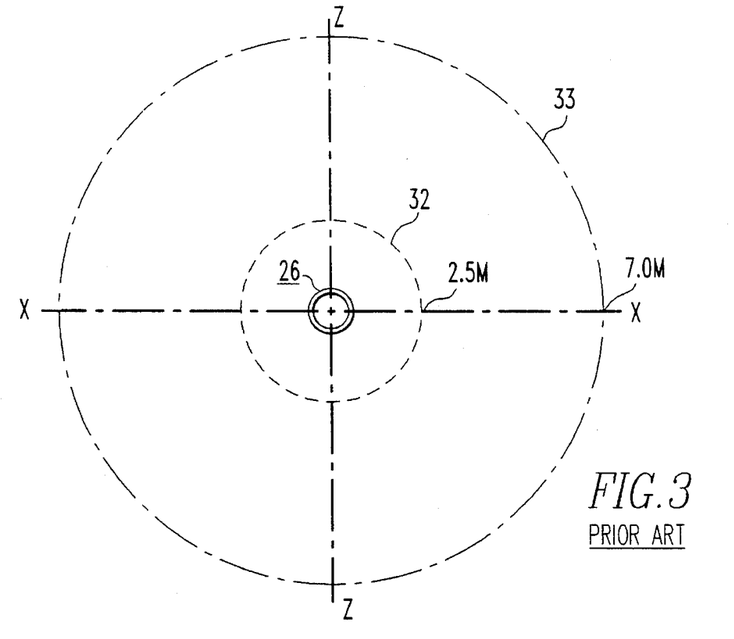
FIG. 3 is a plan view of the coil of FIG. 2 illustrating certain magnetic field exclusionary zones.

An end view of the solenoid 26 is presented in FIG. 3 which additionally illustrates, in the X-Z plane, the exclusionary zones for equipment and personnel. A magnetic flux density of 200 Gauss is illustrated by dashed line 32 and represents the operational limit for electronics and other sensitive equipment. This 200 Gauss line circles the solenoid 26 at an approximate distance of 2.5 meters. A magnetic flux density of 10 Gauss is illustrated by dot-dash line 33 and represents an accepted limit for eliminating potential health risks for personnel. The 10 Gauss line circles the solenoid at a distance of approximately 7.0 meters.

Figure 4:
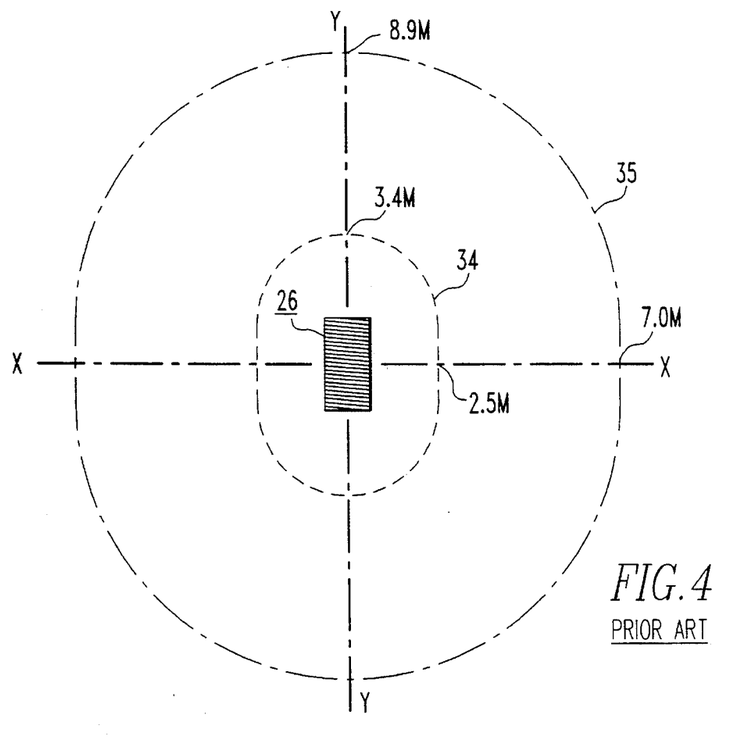
FIG. 4 is an end view of the coil of FIG. 2 illustrating the magnetic energy exclusionary zones.

FIG. 4 is a plan view of coil 26 illustrating the exclusionary zones in the X-Y plane. Dashed line 34 represents the 200 Gauss line which is 3.4 meters away from the center of coil 26, and dot-dash line 35 represents the 10 Gauss line which is 8.9 meters away from the end of coil 26. In order to reduce the distance at which the exclusionary zones would take effect, the solenoid 26 would normally be provided with extensive and heavy magnetic shielding. The present invention accomplishes this reduction without the requirement of this additional shielding.

Figure 5:
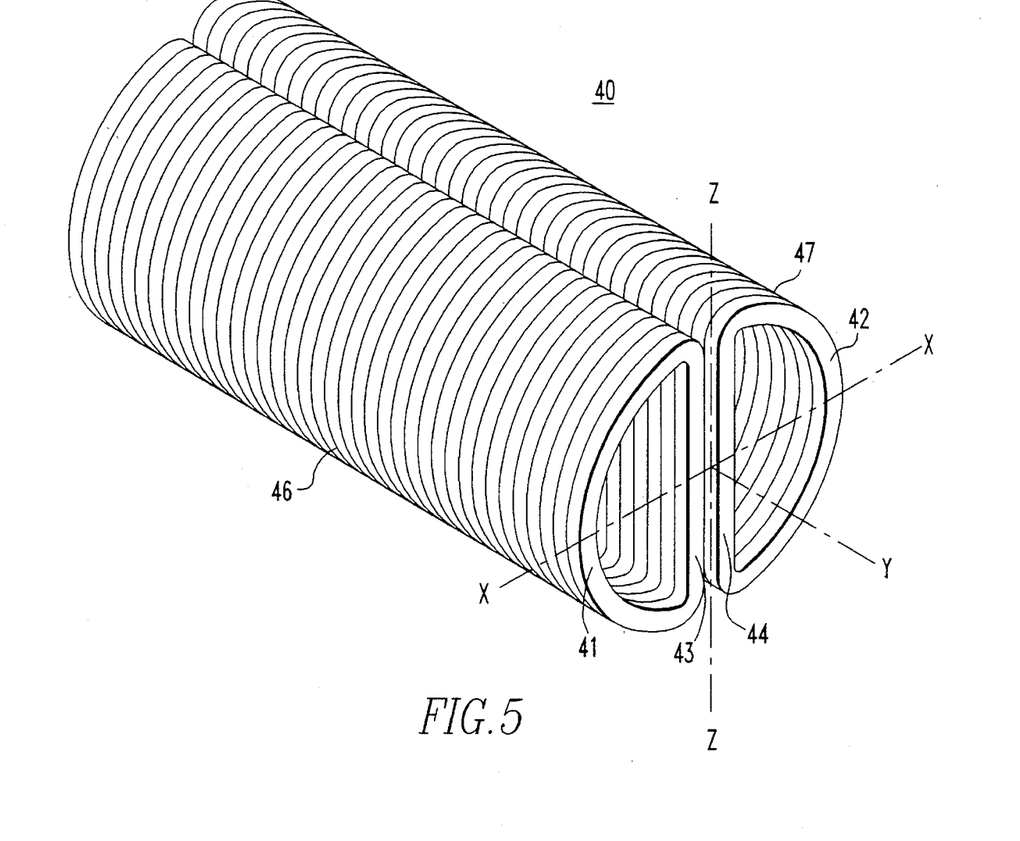
FIG. 5 is a view of an improved inductor arrangement in accordance with the present invention.

FIG. 5 illustrates an improved inductor in accordance with the present invention. The inductor 40 includes first and second D-shaped elongated coils 41 and 42 oriented such that their respective flat sides 43 and 44 are adjacent and facing one another.

The windings 46 and 47 of the D-shaped coils 41 and 42 are electrically connected to one another such that when supplied with electric current, the resulting magnetic fields of the first and second D-shaped coils 41 and 42 oppose one another.

Figure 6:
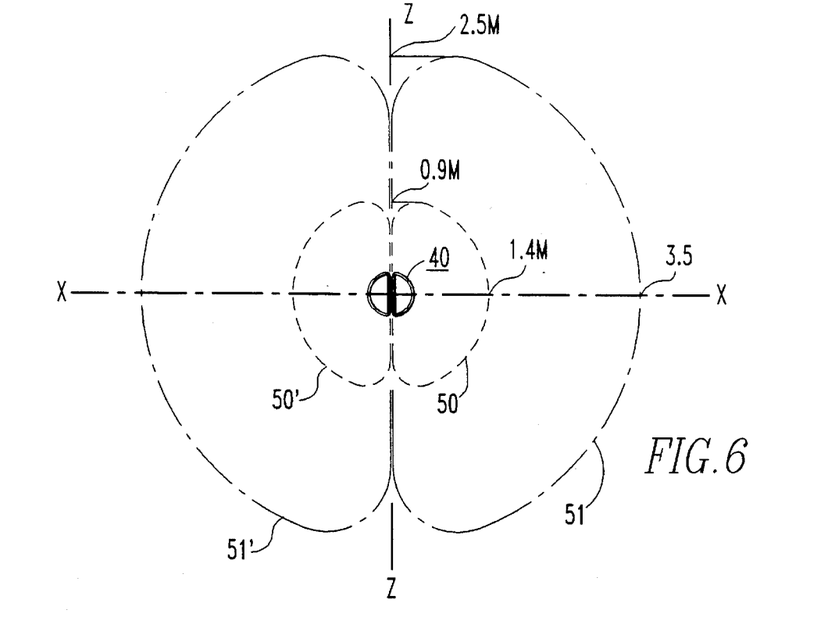
FIG. 6 is an end view of the improved coil of FIG. 5 illustrating the magnetic energy exclusionary zones.
Figure 7:
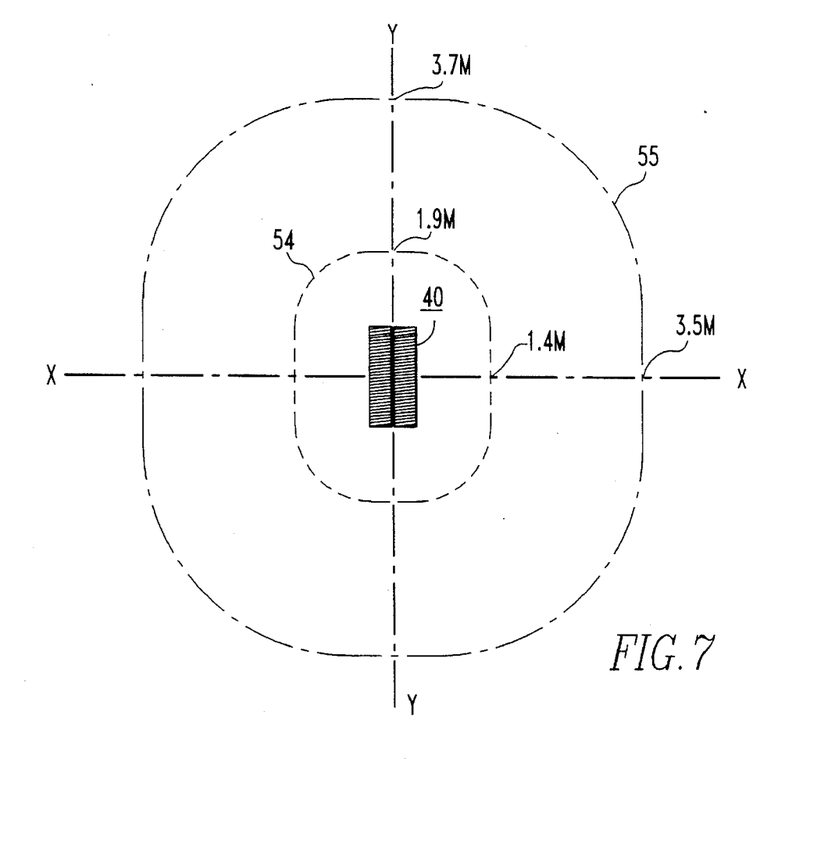
FIG. 7 is a plan view of the inductor of FIG. 5 illustrating the magnetic energy exclusionary zones.

FIGS. 6 and 7 illustrate the reduction in external magnetic field for the inductor of the present invention over that of a conventional solenoid. The overall coil envelope for the dual D-shaped coil arrangement is the same as that for the solenoid illustrated in FIG. 2 to allow for an equal comparison. The parameters of the dual D coil arrangement are listed in Table 2:

TABLE 2

| | |
|---|---|
| Overall Coil Envelope: | 0.8 m × 0.8 m × 1.6 m |
| Number of Turns: | 2362 per coil |
| Current Density: | 118 A/mm$^2$ |
| Peak Current: | 4000 Amperes |
| Peak Internal B Field: | 7.40 Tesla |
| Inductance: | 1.22 Henries |
| Energy Storage: | 9.75 Mega Joules |

A comparison of Tables 1 and 2 indicate that the current density for the improved inductor must be increased by 18 percent to achieve the same energy storage. The peak internal magnetic field is also higher for this arrangement. The increased current density and peak internal B field are still within reasonable limits for the niobium-titanium conductors utilized to achieve superconductivity.

In FIG. 6, which is a view along the X-Z plane, dashed lines 50 and 50' represent the 200 Gauss exclusionary zone while dot-dash lines 51 and 51' represent the 10 Gauss lines.

In FIG. 7, dashed line 54 represents the 200 Gauss line while dot-dash line 55 represents the 10 Gauss line in the X-Y plane. It may be seen from the field maps of FIGS. 3, 4, 6 and 7 that the inductor of the present invention substantially reduces the external magnetic field and a comparison of the two devices is set out in Table 3:

TABLE 3

| | Inductor 26 | Inductor 40 |
|---|---|---|
| | 10 Gauss Line | |
| X Direction: | 7.0 M | 3.5 M |
| Y Direction: | 8.9 M | 3.7 M |
| Z Direction: | 7.0 M | 2.5 M |

TABLE 3-continued

| | Inductor 26 | Inductor 40 |
|---|---|---|
| | 200 Gauss Line | |
| X Direction: | 2.5 M | 1.4 M |
| Y Direction: | 3.4 M | 1.9 M |
| Z Direction: | 2.5 M | 0.9 M |

The table and figures indicate that the improved inductor in accordance with the present invention reduces the external magnetic field substantially and in fact the distance to the 10 Gauss line is seen to be reduced by approximately 50 percent.

Figure 8:
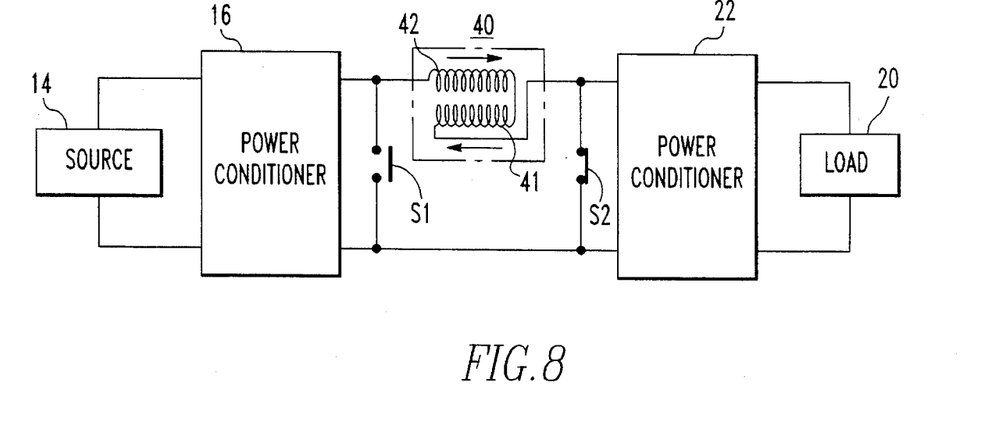
FIG. 8 is a block diagram illustrating the use of the improved inductor of the present invention in a system such as illustrated in FIGS. 1A through 1D.

FIG. 8 illustrates the inductor of the present invention in a magnetic energy storage system as previously illustrated in FIGS. 1A through 1D. During the charging cycle, it is seen that the D-shaped coils 41 and 42 are electrically connected together such that current in coil 41 is opposite to the current in coil 42 leading to the significant reduction in the radiated external magnetic field.

Figure 9:
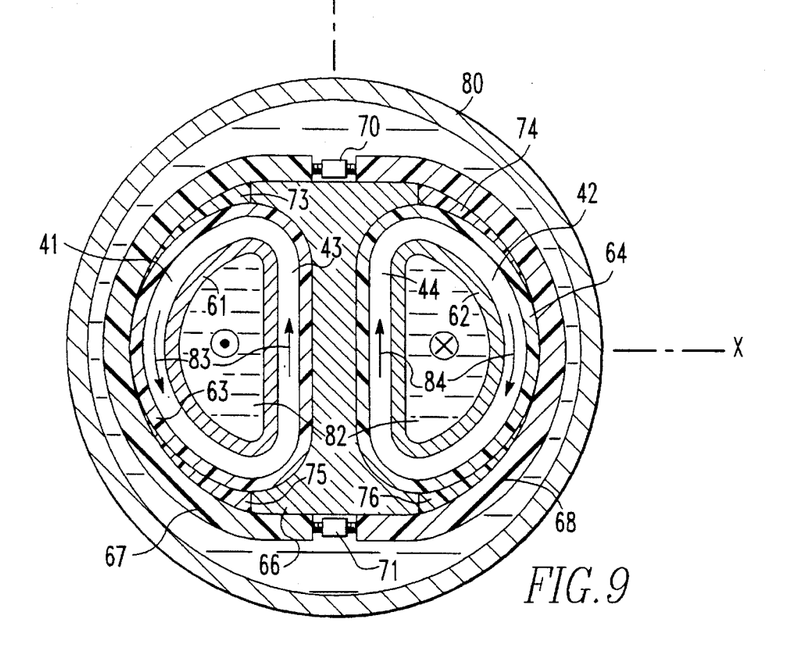
FIG. 9 is an axial cross-sectional view of one embodiment of the inductor in accordance with the present invention.

FIG. 9 illustrates an axial cross-sectional view of one embodiment for the mechanical packaging of the D-shaped coils for use in a magnetic energy storage system. The D-shaped coils 41 and 42 are wound on respective D-shaped coil formers 61 and 62 which may be metallic or a filament-wound composite.

The completed coils are then wrapped, around their periphery, with a glass epoxy tape 63 and 64 to provide ground wall insulation. The coils 41 and 42 are stacked side by side with their straight legs 43 and 44 adjacent to each other and separated by a filament-wound composite central support member 66 positioned between the coils 41 and 42 and which contacts the respective flat sides 43 and 44 of the D-shaped coils. This central support member 66 not only aligns the D-shaped coils 41 and 42 but also reduces their compliance in the Z direction.

Both coil stacks and intermediate central support member 66 are bound together and contained by a metallic belt arrangement comprised of two belt halves 67 and 68 joined at their ends by means of turnbuckles 70 and 71. The belt halves 67 and 68 may be fabricated by bending and joining thick plate stock to the desired profile. If required, a multiplicity of joined plates may be used and may be made of a material such as aluminum, stainless steel, inconel, incoloy, and titanium. Any void spaces between the belt and the coils are filled with an epoxy or putty which hardens upon curing, and is indicated by reference numbers 73 to 76.

The belt halves and turnbuckle arrangement applies a preload to the coils and provides additional structural reinforcement against forces acting to rupture the coils in the X-Z plane. These bursting forces are reacted as tensile stress within the belting arrangement.

The entire assembly thus far described, is centered within a cylindrical cryogenic coolant vessel 80 fabricated preferably from a nonmagnetic high resistivity material such as stainless steel and filled with a cryogenic liquid gas such as liquid helium 82.

Arrows 83 superimposed upon coil 41 represent the electric current flow vector in that coil and which produces a magnetic field, indicated by the dot, out of the plane of the figure. Arrows 84 represent the electric current flow vector in coil 42 which produces, as indicated by the X, a magnetic field into the plane of the figure.

Upon cooldown to cryogenic operating temperatures, the integrated differential thermal contraction between the belt arrangement 67 and 68 and the coils 41 and 42 result in additional coil preload for resisting electromagnetic structural loads. The containment means significantly reduces or eliminates relative movement between various members so as to effectively present a monolithic structure. Without such construction, rubbing between the parts could occur; such rubbing would cause heat which may destroy the superconducting properties of the inductor.

Figure 10:
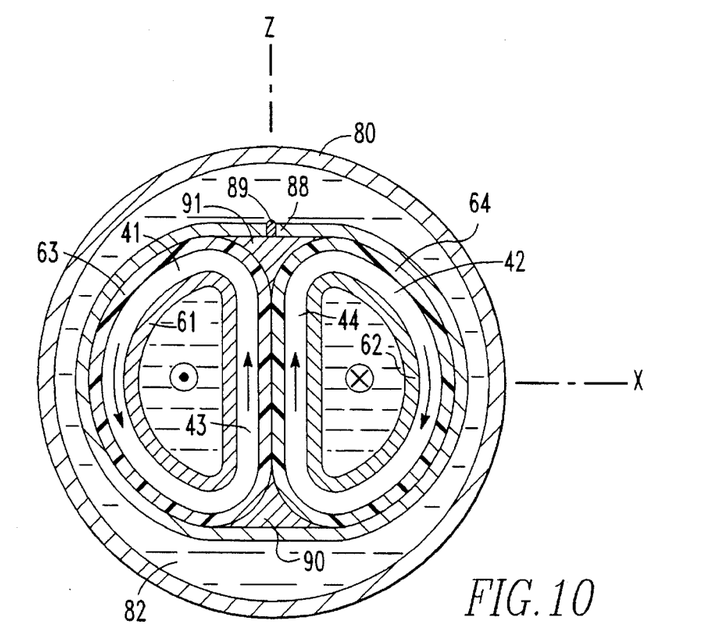
FIG. 10 is an axial cross-sectional view of yet another embodiment.

FIG. 10 illustrates an alternate embodiment of the present invention intended for low energy density applications requiring relatively lightweight containment structures. In the embodiment of FIG. 10, the previously used belt halves 67 and 68 as well as turnbuckles 70 and 71 have been eliminated and replaced by a single thin metallic tension strap or band 88 with the ends tensioned and fastened by a suitable process such as welding, as indicated by numeral 89. The central support member 68 is eliminated and the glass epoxy tape 63 and 64 on the flat sides 43 and 44 of the coils contact one another and the resulting void spaces are provided with a suitable filler such as indicated by reference numerals 90 and 91.

We claim:

1. An improved energy storage inductor having a reduced external magnetic field, comprising:
   a) first and second D-shaped elongated superconducting coils;
   b) the flat sides of said D-shaped coils being adjacent and facing one another;
   c) the windings of said coils being oriented such that when supplied with electric current, the resulting magnetic fields of said first and second D-shaped coils oppose one another;
   d) containment means operable to support and restrain movement of said D-shaped coils relative to one another and including a central support member positioned between said first and second D-shaped coils and contacting at least the flat sides of said D-shaped coils;
   e) a belt arrangement positioned around and contacting the outer surface of said first and second D-shaped coils to restrain relative movement between said first and second D-shaped coils and said central support member;
   f) a cryogenic container;
   g) said first and second D-shaped coils being immersed in said cryogenic container.

2. Apparatus according to claim 1 wherein:
   said cryogenic container is filled with a cryogenic liquid gas.

3. Apparatus according to claim 2 wherein:
   said first and second D-shaped coils are wound around respective coil formers.

4. Apparatus according to claim 3 wherein:
   said coil formers are hollow to allow passage of said cryogenic liquid gas.

5. Apparatus according to claim 1 wherein:
   said cryogenic container is cylindrical.

6. Apparatus according to claim 1 which includes:
   solid filler material positioned in any voids which existed between said belt arrangement, support member and said first and second D-shaped coils.

7. An improved energy storage inductor having a reduced external magnetic field, comprising:
   a) first and second D-shaped elongated superconducting coils;
   b) the flat sides of said D-shaped coils being in contact with one another;
   c) the windings of said coils being oriented such that when supplied with electric current, the resulting magnetic fields of said first and second D-shaped coils oppose one another;
   d) containment means operable to support and restrain movement of said D-shaped coils relative to one another;
   e) a belt arrangement positioned around and contacting the outer surface of said first and second D-shaped coils to restrain relative movement between them;
   f) solid filler material positioned in any voids which existed between said belt arrangement and said first and second D-shaped coils;
   g) a cryogenic container;
   h) said first and second D-shaped coils being immersed in said cryogenic container.

8. Apparatus according to claim 7 wherein:
   said cryogenic container is filled with a cryogenic liquid gas.

9. Apparatus according to claim 8 wherein:
   said first and second D-shaped coils are wound around respective coil formers.

10. Apparatus according to claim 9 wherein:
    said coil formers are hollow to allow passage of said cryogenic liquid gas.

11. Apparatus according to claim 7 wherein:
    said cryogenic container is cylindrical.

* * * * *